(12) United States Patent
Marin et al.

(10) Patent No.: US 7,697,480 B2
(45) Date of Patent: *Apr. 13, 2010

(54) METHOD AND APPARATUS FOR INTER-SYSTEM ACTIVE HANDOFF OF A HYBRID SUBSCRIBER UNIT

(75) Inventors: James S. Marin, Murphy, TX (US); Senaka Balasuriya, Weston, FL (US)

(73) Assignee: Motorola, Inc, Schaumburg, IL (US)

( * ) Notice: Subject to any disclaimer, the term of this patent is extended or adjusted under 35 U.S.C. 154(b) by 626 days.

This patent is subject to a terminal disclaimer.

(21) Appl. No.: 11/283,075

(22) Filed: Nov. 18, 2005

(65) Prior Publication Data

US 2006/0111115 A1  May 25, 2006

Related U.S. Application Data

(60) Provisional application No. 60/629,960, filed on Nov. 22, 2004.

(51) Int. Cl.
- *H04W 4/00* (2006.01)
- *H04L 12/66* (2006.01)
- *H04W 36/00* (2006.01)

(52) U.S. Cl. .................. 370/331; 370/328; 370/352; 370/356; 455/436; 455/442

(58) Field of Classification Search ......... 370/328–331, 370/334, 338, 341, 348, 352–357, 400–402, 370/902, 912–913, 310, 349, 332, 385, 387–388; 455/432.1–432.3, 433–434, 435.1–435.3, 455/436–442, 445, 450–451, 452.1–452.2, 455/456.1–456.6, 466, 550.1, 552.1, 556.2, 455/560–561, 509, 556.1, 524–525, 551

See application file for complete search history.

(56) References Cited

U.S. PATENT DOCUMENTS

| 5,487,174 | A | 1/1996 | Persson |
| 5,778,338 | A | 7/1998 | Jacobs et al. |
| 6,141,353 | A | 10/2000 | Li |
| 6,400,946 | B1 * | 6/2002 | Vazvan et al. ............ 455/432.1 |
| 6,721,565 | B1 | 4/2004 | Ejzak et al. |

(Continued)

FOREIGN PATENT DOCUMENTS

WO  2004082219 A3  9/2004

*Primary Examiner*—Meless N Zewdu
(74) *Attorney, Agent, or Firm*—Steven A. May

(57) ABSTRACT

A communication system provides for an active handoff of a voice call between a packet switched network and a circuit switched network. An active handoff from the packet switched network to the circuit switched network is accomplished by multicasting the call over forward links of both networks during the handoff. An active handoff from the circuit switched network to the packet switched network is accomplished by multicasting the call over reverse links of both networks during the handoff. The former handoff further may be facilitated by routing the call for each network through a same packet data control switch, and the latter handoff further may be facilitated by routing the call for each network through a same mobile switching center. In order for a subscriber unit to operate concurrently in both networks, the subscriber unit may comprise multiple transceivers or a single transceiver that is rapidly switched between the networks.

16 Claims, 5 Drawing Sheets

U.S. PATENT DOCUMENTS

| | | | |
|---|---|---|---|
| 6,741,695 B1 | 5/2004 | McConnell et al. | |
| 6,795,444 B1 * | 9/2004 | Vo et al. | 370/401 |
| 6,944,150 B1 | 9/2005 | McConnell et al. | |
| 6,996,079 B1 * | 2/2006 | Bergenwall et al. | 370/331 |
| 7,010,300 B1 * | 3/2006 | Jones et al. | 455/439 |
| 7,197,307 B2 | 3/2007 | Kirla | |
| 7,260,399 B1 * | 8/2007 | Oh et al. | 455/436 |
| 7,295,843 B2 * | 11/2007 | Ejzak et al. | 455/442 |
| 7,359,347 B2 * | 4/2008 | Ahmavaara et al. | 370/328 |
| 2002/0066011 A1 | 5/2002 | Vialen et al. | |
| 2002/0102962 A1 | 8/2002 | Grinn et al. | |
| 2003/0031160 A1 * | 2/2003 | Gibson Ang et al. | 370/349 |
| 2003/0193911 A1 * | 10/2003 | Zhao et al. | 370/311 |
| 2004/0199637 A1 | 10/2004 | Li et al. | |
| 2004/0240430 A1 | 12/2004 | Lin et al. | |
| 2004/0246990 A1 | 12/2004 | Krishnamurthi et al. | |
| 2004/0259549 A1 | 12/2004 | Ejzak et al. | |
| 2005/0245261 A1 * | 11/2005 | Ejzak | 455/436 |
| 2006/0019659 A1 | 1/2006 | Rosenberg et al. | |
| 2006/0083199 A1 | 4/2006 | Yang | |
| 2006/0109817 A1 * | 5/2006 | Rammnna et al. | 370/331 |
| 2006/0109818 A1 * | 5/2006 | Marin et al. | 370/352 |
| 2006/0109819 A1 * | 5/2006 | Marin et al. | 370/331 |
| 2006/0126564 A1 * | 6/2006 | Ramanna et al. | 370/331 |

* cited by examiner

602 — REFER sip:ua1@home1.net SIP/2.0
   Via: SIP/2.0/UDP
      p1.home1.net:5060;branch=z9hG
      4bK34ghi7ab04
604 — To: sip:ua1@home1.net
606 — From: sip:ua1@home1.net;tag=456248
   Call-ID: 84387637684230998sdasd9
   CSeq: 18 REFER
   Contact: sip:ua1@192.0.2.4
608 — P-Access-Network-Info: "3GPP2-1X-RTT"

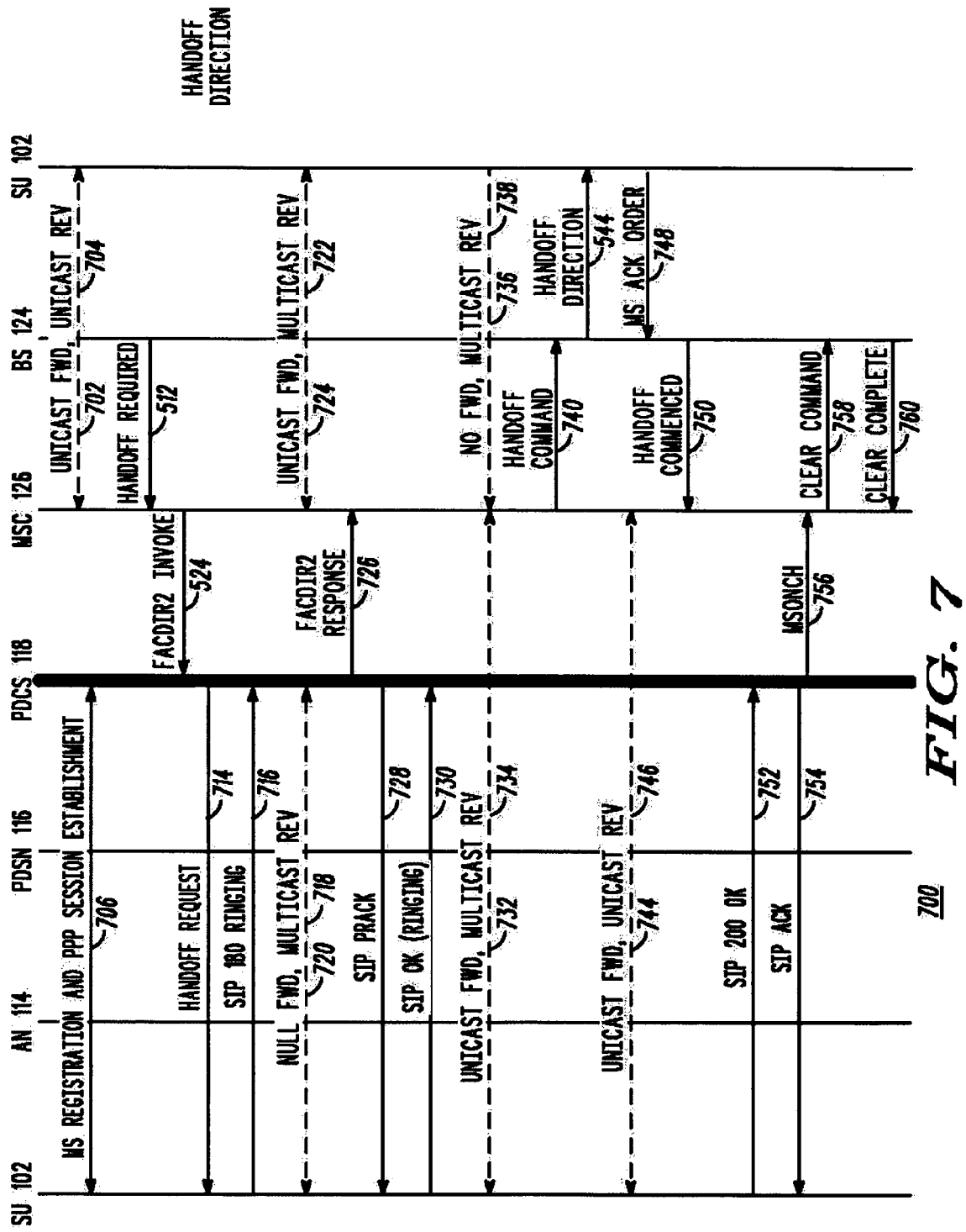

METHOD AND APPARATUS FOR INTER-SYSTEM ACTIVE HANDOFF OF A HYBRID SUBSCRIBER UNIT

CROSS REFERENCE TO RELATED APPLICATION

The present application claims priority from provisional application Ser. No. 60/629,960, entitled "METHOD AND APPARATUS FOR INTER-SYSTEM ACTIVE HANDOFF OF A HYBRID SUBSCRIBER UNIT," filed Nov. 22, 2004, which is commonly owned and incorporated herein by reference in its entirety and is a divisional application of application Ser. No. 11/282,918, filed on the same date as the present application.

FIELD OF THE INVENTION

The present invention relates generally to wireless communication systems, and more specifically to handoff of a hybrid communication device between a Voice over Internet Protocol (VoIP) communication session and a conventional cellular communication session.

BACKGROUND OF THE INVENTION

The evolution of cellular communications has resulted in a proliferation of networks of different technologies and corresponding different air interfaces. As a result, during the course of a single voice call, a wireless subscriber unit may roam among multiple networks, wherein each such network implements a different technology than the other networks of the multiple networks. Among the different network technologies are packet switched CDMA (Code Division Multiple Access) technologies, such as CDMA 2000 1XEV-DO (1X Evolution Data Only) or packet switched CDMA 1XRTT (1X Radio Transmission Technology), that are capable of providing Voice over Internet Protocol (VoIP) communication services, and conventional, or legacy, CDMA cellular communication technologies, such as a CDMA 1X, that provide circuit switched voice communication systems.

As the subscriber unit roams among a packet switched CDMA communication network and a circuit switched CDMA communication network, it may be beneficial to system performance to handoff the subscriber unit from the former network to the latter system performance to handoff the subscriber unit from the former network to the latter network or from the latter network to the former network. For example, the channel conditions associated with one such network may be more favorable than the channel conditions associated with the other such network due to such factors as fading, adjacent and co-channel interference, and available power at a serving base station (BS) or radio access network (RAN). By way of another example, an operator of both a packet switched CDMA network and a circuit switched CDMA network may desire to move the subscriber unit from one such network to the other such network for purposes of balancing system loading.

Currently, the only defined method for executing a handoff between a packet switched CDMA or WLAN network and a circuit switched CDMA network is an execution of a hard handoff, wherein a subscriber unit must drop a radio resource of a network of a first CDMA technology prior to acquiring a radio resource of a network of a second CDMA technology. A result is a brief period of time during which the subscriber unit is not actively engaged in a communication session with either network. Further, when executing a hard handoff there is no linkage between the two networks as the subscriber unit must drop the first network and acquire the second network without any assistance from the BS or RAN of either network. As a result, voice traffic may be lost during the handoff, resulting in poor system performance and efficiency and disgruntled end users.

Therefore, a need exists for a method and apparatus for an active handoff of a voice call between a packet switched CDMA or WLAN network and a circuit switched CDMA network that assures that the subscriber unit is actively engaged in a communication session with at least one network at all times.

BRIEF DESCRIPTION OF THE DRAWINGS

FIG. 6 is a diagram of an exemplary SIP REFER message as modified in accordance with an embodiment of the present invention.

FIG. 7 is a signal flow diagram illustrating a handoff of a voice call from a circuit switched network of FIG. 1 to a packet-based network of FIG. 1 in accordance with another embodiment of the present invention.

DETAILED DESCRIPTION OF THE INVENTION

Figure 1:
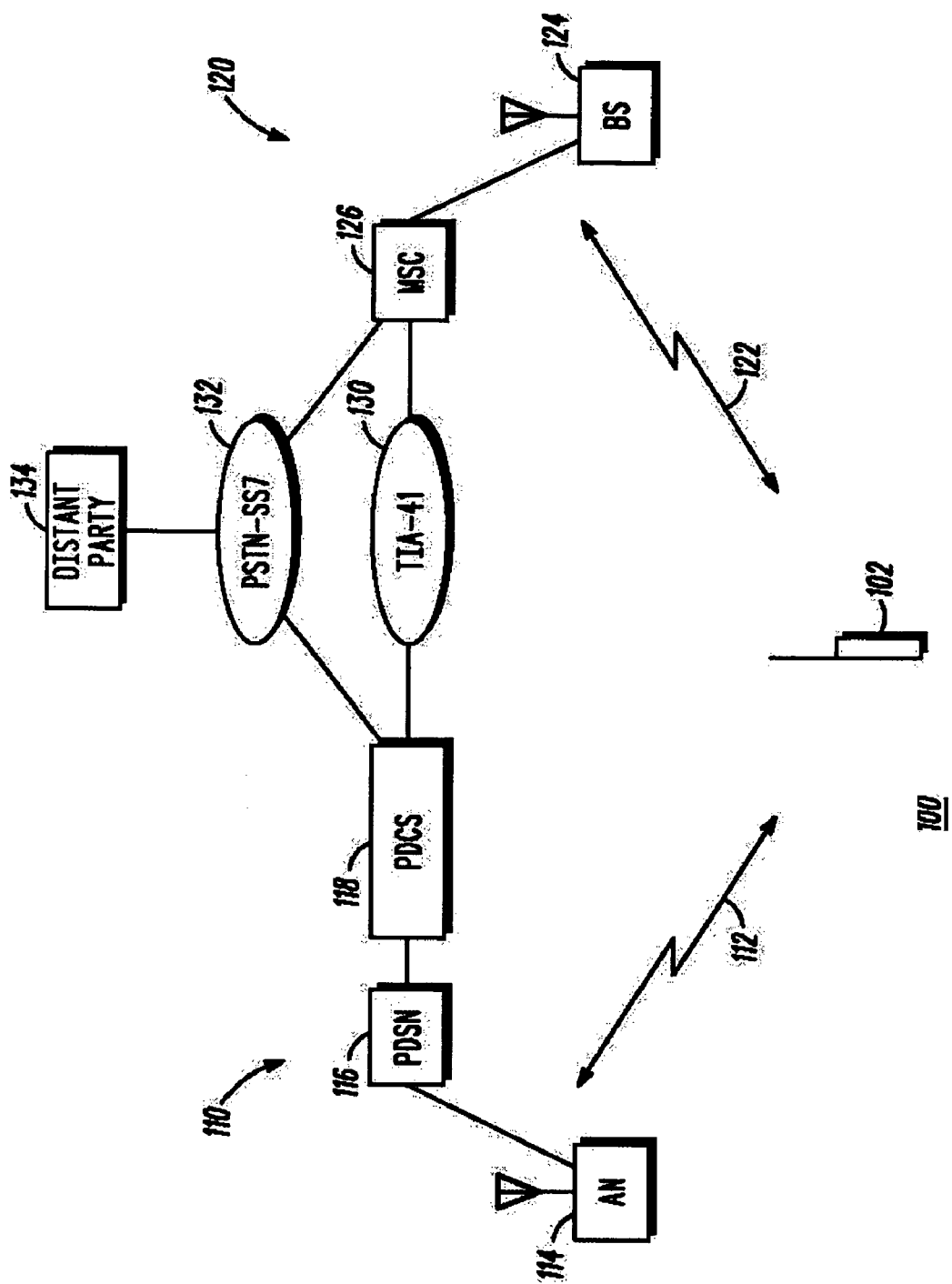
FIG. 1 is a block diagram of a wireless communication system in accordance with an embodiment of the present invention.

To address the need for a method and apparatus for an active handoff of a voice call between a packet switched CDMA or WLAN network and a circuit switched CDMA network that assures that the subscriber unit is actively engaged in a communication session with at least one network at all times, a communication system is provided that provides for an active handoff of a voice call between a packet switched network, such as a CDMA 2000 1XRTT network, a CDMA 2000 1XEV-DO network, or a WLAN network, and a circuit switched network, preferably a CDMA 1X network, by transmitting the call over both networks (herein referred to as multicasting) during the course of the handoffs. An active handoff from the packet switched network to the circuit switched network is accomplished by multicasting the call over forward links of both networks during the handoff. An active handoff from the circuit switched network to the packet switched network is accomplished by multicasting the call over reverse links of both networks during the handoff. The former handoff further may be facilitated by maintaining a packet data control switch of the packet switched network in the call even when the call is routed through the circuit switched network, and the latter handoff further may be facilitated by maintaining a mobile switching center of the circuit switched network in the call even when the call is routed through the packet switched network. In order for a hybrid subscriber unit to operate concurrently in both networks, the subscriber unit may comprise multiple transceivers. However, in another embodiment of the present invention, the hybrid subscriber unit may comprise a single transceiver that is rapidly switched between the networks to give the appearance of concurrent operation. In addition, when switching between networks, a vocoder in the single transceiver subscriber unit may be instructed by the processor to use a reduced rate that allows for the time for the rapid switching without severely degrading voice quality.

Generally, an embodiment of the present invention encompasses a method for handoff of a voice call from a packet switched network having a packet data control switch to a circuit switched network. The method includes conveying forward link voice traffic to, and receiving reverse link voice traffic from, a subscriber unit via the packet switched network and receiving, by the packet switched network, a notification to hand off the call to the circuit switched network. The method further includes, in response to receiving the handoff notification, conveying forward link voice traffic to the subscriber unit via the packet switched network and via the packet data control switch and the circuit switched network, and concurrently receiving reverse link voice traffic only via the packet switched network. The method further includes, when conveying forward link voice traffic to the subscriber unit via each of the packet switched network and the circuit switched network, switching from the packet switched network to the packet data control switch and the circuit switched network for reception of reverse link voice traffic and, in response to switching from the packet switched network to the circuit switched network for reception of reverse link voice traffic, ceasing conveying forward link voice traffic to the subscriber unit via the packet data control switch and the packet switched network while continuing to convey forward link voice traffic to the subscriber unit via the packet data control switch and the circuit switched network.

Another embodiment of the present invention encompasses a packet data control switch having a processor configured to, in association with a subscriber unit call, route forward link voice traffic and receive reverse link voice traffic via a packet switched network, receive a notification to hand off the call from the packet switched network to a circuit switched network, in response to receiving the handoff notification, route forward link voice traffic to the subscriber unit via both the packet switched network and the circuit switched network and concurrently receive reverse link voice traffic only via the packet switched network, when conveying forward link voice traffic to the subscriber unit via each of the packet switched network and the circuit switched network, switch reception of reverse link voice traffic from the packet switched network to the circuit switched network, and in response to switching reception of reverse link voice traffic from the packet switched network to the circuit switched network, cease routing forward link voice traffic to the subscriber unit via the packet switched network while continuing to route forward link voice traffic to the subscriber unit via the circuit switched network.

Yet another embodiment of the present invention encompasses a method for handoff of a voice call from a circuit switched network to a packet switched network. The method includes conveying forward link voice traffic to, and receiving reverse link voice traffic from, a subscriber unit via the circuit switched network and determining, by the circuit switched network, to hand off the call. The method further includes notifying the packet switched network, by the circuit switched network, of the need for a handoff and, in response to receiving the handoff notification, conveying, by the packet switched network of the subscriber unit, a request to perform a handoff and establishing a communication session between the packet switched network and the subscriber unit. The method further includes receiving reverse link voice traffic from the subscriber unit via the circuit switched network and via the packet switched network, and concurrently conveying forward link voice traffic to the subscriber unit only via the circuit switched network and, when receiving reverse link voice traffic via the packet switched network and the circuit switched network, switching from the circuit switched network to the packet switched network for conveyance of forward link voice traffic to the subscriber unit. The method further includes, in response to switching forward link voice traffic from the packet switched network to the circuit switched network, ceasing reception of reverse link voice traffic via the circuit switched network while continuing to receive reverse link voice traffic via the packet switched network.

Still another embodiment of the present invention encompasses a communication system for inter-network handoff of a voice call from a circuit switched network to a packet switched network. The communication system includes a base station that transmits forward link voice traffic to a subscriber unit via a first forward link, receives reverse link voice traffic from the subscriber unit via a first reverse link from, and that determines to hand off the call. The communication system further includes a mobile switching center in communication with the base station that conveys the forward link voice traffic to the base station, receives the reverse link voice traffic from the base station, and that, in response to the determination to hand off the call, conveys a notification of the need for a handoff, and a packet data control switch that receives the handoff notification from the mobile switching center and, in response to receiving the handoff notification, requests that the subscriber unit perform a handoff. The communication system further includes an access network in communication with the packet data control switch that, in response to the request to perform a handoff, establishes a second forward link and a second reverse link with the subscriber unit. In response to the establishment of the second forward link and the second reverse link with the subscriber unit, each of the base station and the access network receives reverse link voice traffic from the subscriber unit while only the base station conveys forward link voice traffic to the subscriber unit. After each of the base station and the access network begins receiving reverse link voice traffic from the subscriber unit, conveyance of the forward link voice traffic to the subscriber unit is switched from the base station and the first forward link to the access network and the second forward link. In response to switching conveyance of forward link voice traffic from the base station and the first forward link to the access network and the second forward link, the base station ceases receiving reverse link voice traffic while the access network continues to receive reverse link voice traffic.

Yet another embodiment of the present invention encompasses a method for handoff of a voice call from a packet switched network having a packet data control switch to a circuit switched network. The method includes communicating voice traffic via the packet switched network, receiving, by the packet switched network, a notification to hand off the call, wherein the notification to hand off identifies the circuit switched network as the network to hand off the call to, and in response to receiving the handoff notification, establishing communication via the circuit switched network and terminating communication via the packet switched network.

Still another embodiment of the present invention encompasses a method for handoff of a voice call from a packet switched network having a packet data control switch to a circuit switched network. The method includes communicating voice traffic via the packet switched network, determining, by subscriber unit, to hand off the call, transmitting a notification to hand off the call, wherein the notification to hand off identifies the circuit switched network as the network to hand off the call to, and in response to transmitting the handoff notification, establishing communication via the circuit switched network and terminating communication via the packet switched network.

Yet another embodiment of the present invention encompasses a method for emulating concurrent operation by a hybrid subscriber unit in each of a network associated with a first radio frequency (RF) technology and a network associated with a second RF technology. The method includes, when transmitting, alternating between transmission via a first air interface associated with the first RF technology and transmission via a second air interface associated with the second RF technology and, when receiving, alternating between reception via an air interface associated with the first RF technology and reception via an air interface associated with the second RF technology.

Still another embodiment of the present invention encompasses a hybrid subscriber unit capable of operating in each of a network associated with a first RF technology and a network associated with a second RF technology. The subscriber unit includes a transceiver for transmitting and receiving RF communications and a processor in communication with to the transceiver. The processor, when transmitting, alternates between transmission via an air interface associated with the first RF technology and transmission via an air interface associated with the second RF technology and, when receiving, alternates between reception via a first air interface associated with the first RF technology and reception via a second air interface associated with the second RF technology.

The present invention may be more fully described with reference to FIGS. 1-7. FIG. 1 is a block diagram of a wireless communication system 100 in accordance with an embodiment of the present invention. Communication system 100 includes a wireless IP (Internet Protocol)-based packet switched network 110 and a wireless circuit switched network 120. Packet switched network 110 includes a packet data control switch (PDCS) 118 that is in communication with a packet-based wireless Access Network (AN) 114, such as a Radio Access Network (RAN) or a wireless local area network (WLAN) Access Point (AP), via a Packet Data Serving Node (PDSN) 116. In one embodiment of the present invention, PDCS 118 may comprise one or more of a Mobile Switching Center Evolution-Emulation (MSCe) and a Media Gateway (MGW). In other embodiments of the present invention, PDCS 118 may further comprise, or be coupled to, one or more Session Initiation Protocol (SIP) Servers. PDCS 118 further provides transcoding functionality with respect to transcoding between the vocoder formats provided by subscriber unit 102 and the 64 kbps Pulse Code Modulation (PCM) format (ITU-T G.711) transported by PSTN 132. In still other embodiments of the present invention, PDCS 118 may comprise one or more SoftSwitch(es), which is available from Motorola, Inc., of Schaumburg, Ill. and other suppliers.

Figure 2:
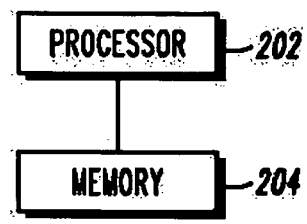
FIG. 2 is a block diagram of a packet data control switch of FIG. 1 in accordance with an embodiment of the present invention.

FIG. 2 is a block diagram of PDCS 118 in accordance with an embodiment of the present invention. PDCS 118 includes a processor 202, such as one or more microprocessors, microcontrollers, digital signal processors (DSPs), combinations thereof or such other devices known to those having ordinary skill in the art, which processor is configured to execute the functions described herein as being executed by PDCS 118. PDCS 118 further includes at least one memory device 204 associated with processor 202, such as random access memory (RAM), dynamic random access memory (DRAM), and/or read only memory (ROM) or equivalents thereof, that store data and programs that may be executed by the processor and that allow the PDCS to perform all functions necessary to operate in communication system 100.

Circuit switched network 120 includes a Base Station (BS) 124 that is in communication with a circuit switch-based Mobile Switching Center (MSC) 126. With respect to circuit switched network 120, MSC 126 is coupled to a respective Home Location Register (HLR) (not shown) and further is coupled to a respective Visited Location Register (VLR) (not shown) or is coupled to an Authentication, Authorization, and Accounting Server (AAA) (not shown). As is known in the art, the HLR and VLR or AAA associated with MSC 126 includes mobility and provisioning information associated with each subscriber unit subscribed to and/or registered for the services of the PDCS's or MSC's respective network 110, 120, such as a profile of the subscriber unit, including the capabilities of the subscriber unit, and an AN or BS currently serving the subscriber unit. With respect to packet switched network 110, when Mobile IP (Internet Protocol) is used, macro-mobility is handled by a Home Agent (HA) (not shown) and a Foreign Agent (FA) (not shown) associated with PDSN 116 as is known in the art. When simple IP is used, there is no macro-mobility and micro-mobility is handled by a hierarchical arrangement of RANs, PSDNs, and PCFSs as is known in the art. AN 114 and BS 124 each provides wireless communication services to the subscriber units located in a coverage area of the AN or BS via a respective air interface 112, 122. Each air interface 112, 122 includes a forward link that includes at least one forward link traffic channel and at least one forward link control channel. The forward link may or may not further include a paging channel. For example, in a CDMA 2000 1XEV-DO communication system the paging function is performed using a Route Update Protocol. Each air interface 112, 122 further includes a reverse link that includes at least one reverse link traffic channel, at least one reverse link signaling channel, and an access channel.

Packet switched network 110 and circuit switched network 120, and more particularly PDCS 118 and MSC 126, communicate with each other via an intermediate network 130 that operates in accordance with well-known intersystem protocols and preferably the protocols described in the 3GPP2 (Third Generation Partnership Project 2) TIA-41 (Telecommunications Industry Association-41) standard, that is, 3GPP2 N.S0005. The TIA-41 standard provides standardized intersystem procedures for mobility management in cellular systems and prescribe messaging among Mobile Switching Centers, Home Location Registers (HLRs), Visited Location Registers (VLRs), Authentication Centers (ACs), and other core network elements of cellular systems in order to provide services to subscriber units when interaction is required between different cellular systems. Packet switched network 110 and circuit switched network 120, and more particularly PDCS 118 and MSC 126, are each further coupled to a landline network 132, such as a Public Switched Telephone Network (PSTN) that includes SS7 signaling.

Communication system 100 further includes a wireless subscriber unit (SU) 102, for example but not limited to a cellular telephone, a radiotelephone, or a Personal Digital Assistant (PDA), personal computer (PC), or laptop computer equipped for wireless voice communications. In various communications systems, subscriber unit 102 may also be referred to as an access terminal (AT), a mobile station (MS), or a user's equipment (UE). Subscriber unit 102 comprises a hybrid terminal that is capable of engaging in a Voice over Internet Protocol (VoIP) call with packet switched network 110 and is further capable of engaging in a conventional cellular call with circuit switched network 120, and more particularly is capable of communicating with PDCS 118 via the SIP protocols and with MSC 126 via the IS-2000 protocols.

Figure 3:
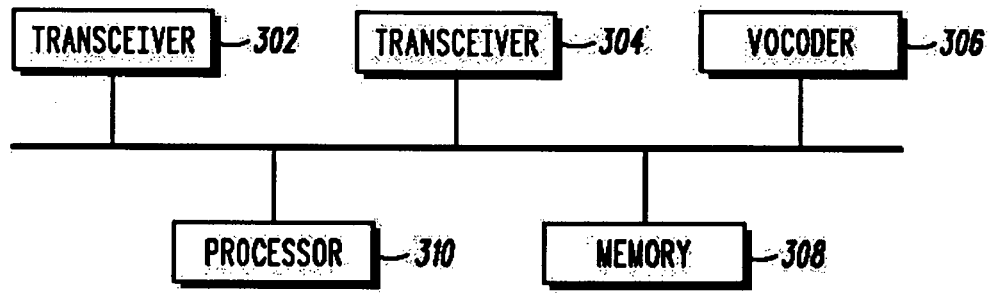
FIG. 3 is a block diagram of a subscriber unit of FIG. 1 in accordance with an embodiment of the present invention.

Referring now to FIG. 3, in one embodiment of the present invention, a hybrid subscriber unit 300, such as subscriber unit 102, capable of operating in communication system 100 may include multiple transceivers, that is, a first transceiver 302 for operation packet switched network 110 and a second transceiver 304 for operation in circuit switched network 120, thereby allowing the subscriber unit to concurrently transmit or receive in each of the two networks. Each transceiver is coupled to a vocoder 306 and a processor 308, which processor is further coupled to an at least one memory device 310.

Figure 4:
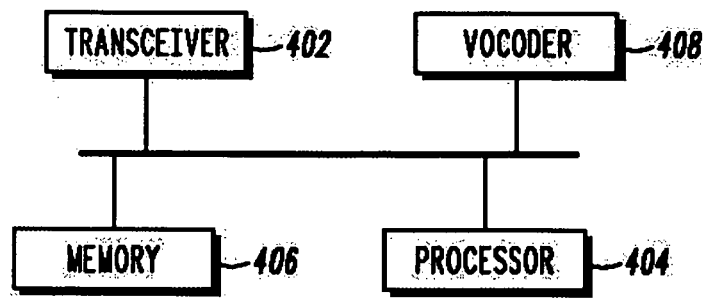
FIG. 4 is a block diagram of a subscriber unit of FIG. 1 in accordance with another embodiment of the present invention.

In another embodiment of the present invention, and referring now to FIG. 4, a hybrid subscriber unit 400, such as subscriber unit 102, capable of operating in communication system 100 may include a single transceiver 402 that emulates the operation of dual transceivers, such as transceivers 302 and 304. Transceiver 402 is coupled to a processor 404, which processor is further coupled to an at least one memory device 406. Processor 404 may cause transceiver 402 to rapidly switch between networks 110 and 120 to give the appearance of concurrent operation. Further, subscriber unit 400 may maintain a priori information in at least one memory device 406 that facilitates the switching between networks at optimum times. In addition, when switching between networks, a vocoder 408 coupled to a bus interconnecting each of transceiver 402, processor 404, and at least one memory device 406 may be instructed by the processor to use a reduced rate that allows for the time for the rapid switching without severely degrading voice quality.

Each of processors 308 and 404 may comprise one or more microprocessors, microcontrollers, digital signal processors (DSPs), combinations thereof or such other devices known to those having ordinary skill in the art, which processor is configured to execute the functions described herein as being executed by subscriber unit 102. Each of at least one memory devices 310 and 406 may comprise random access memory (RAM), dynamic random access memory (DRAM), and/or read only memory (ROM) or equivalents thereof, that store data and programs that may be executed by the associated processor and that allow subscriber unit 102 to perform all functions necessary to operate in communication system 100.

In order for subscriber unit 102 to engaged in a voice call with a distant party 134 via landline network 132 and one or more of packet switched network 110 and circuit switched network 120, each of subscriber unit 102, packet switched network 110, and circuit switched network 120 operates in accordance with well-known wireless telecommunications protocols. While distant party 134 is depicted as being connected to landline network 132, distant party 134 may be connected to any voice communication network, including packet switched network 110 and circuit switched network 120. Preferably, packet switched network 110 is a CDMA (Code Division Multiple Access) 2000 communication system that provides VoIP communication services to subscribers serviced by the network and that operates in accordance with the 3GPP2 and TIA/EIA (Telecommunications Industry Association/Electronic Industries Association) IS-856 and 3GPP2 C.S0024 standards, which provides a compatibility standard for CDMA 2000 1XEV-DO (1X Evolution Data Only) systems. Preferably, circuit switched network 120 is a CDMA 2000 communication system that provides circuit switched communication services to subscribers serviced by the network and that operates in accordance with the CDMA 1X standards.

Further, air interface 122, and correspondingly network 120 and subscriber unit 102, preferably operates in accordance with the TIA/EIA (Telecommunications Industry Association/Electronic Industries Association) one or more of the IS-95 and TIA-2000 standards, or Inter Operability Specifications (IOSs), which provide a compatibility standard for cellular mobile telecommunications systems that operate as a CDMA 2000 system. In addition, air interface 112, and correspondingly network 110 and again subscriber unit 102, preferably operates in accordance with one or more of the IS-95, TIA-2000, TIA-2001 (3GPP2 A.S0011 to A.S0017), or TIA-878 and TIA-1878 (A.s0007 and A.S0008) standards, or Inter Operability Specifications (IOSs), which provide a compatibility standard for cellular mobile telecommunications systems that operate as a CDMA 2000 1XEV-DO, 1XEV-DV, or 1XRTT system. To ensure compatibility, radio system parameters and call processing procedures are specified by the standards, including call processing steps that are executed by an MS and a base station serving the MS and between the BS and associated infrastructure in order to establish a call or execute a handoff. However, those of ordinary skill in the art realize that packet switched network 110 may operate in accordance with any one of a variety of wireless packet data communication systems that provide VoIP communication services, such as a Wireless Local Area Network (WLAN) communication system as described by the IEEE (Institute of Electrical and Electronics Engineers) 802.xx standards, for example, the 802.11, 802.15, 802.16, or 802.20 standards, and that circuit switched network 120 may operate in accordance with any one of a variety of well-known conventional wireless telecommunication systems that provide circuit switched communication services.

In communication system 100, subscriber unit 102 may roam through the system when the subscriber unit is engaged in a voice call. As a result of the roaming, situations may arise where it is desirable to hand off subscriber unit 102 from packet switched network 110 to circuit switched network 120 or from circuit switched network 120 to packet switched network 110. For example and as is known in the art, while roaming in communication system 100 and being serviced by AN 114, subscriber unit 102 may receive a stronger signal from BS 124 or, while being serviced by BS 124, subscriber unit 102 may receive a stronger signal from AN 114. Typically signal strengths are determined by a subscriber unit, such as subscriber unit 102, measuring a pilot channel associated with the AN or BS. When a pilot channel of a serving AN or BS is weaker than a threshold value and a pilot channel of another AN or BS, that typically indicates a desirability of a handoff.

By way of another example, the costs associated with operating subscriber unit 102 on packet switched network 110 may be different from the costs associated with operating subscriber unit 102 on circuit switched network 120. In turn, an operator (or operators) of networks 110 and 120 may charge a different fee for use of each network. As a result, a user of subscriber unit 102 may program into the subscriber a directive to operate on the lower cost network whenever the subscriber unit is able to obtain a traffic channel in the lower cost network. When subscriber unit 102 is engaged in a voice call in a higher cost network and is able to obtain a traffic channel in the lower cost network, the subscriber unit, or the user of the subscriber unit if the user is informed of the availability of a traffic channel in the lower cost network, may initiate a handoff to the lower cost network.

By way of yet another example, it may be desirable to move a subscriber unit, such as subscriber unit 102, that is actively engaged in a voice call in circuit switched network 120 to packet switched network 110 when the user of subscriber unit 102 prefers to use video telephony service rather than a voice call, and packet switched network 110 supports video telephony but circuit switched network 120 does not.

By way of yet another example, for load leveling purposes, for network cost consideration purposes, or due to a need to clear traffic channels in a coverage area in order to facilitate emergency communications, an operator of a communication system such as communication system 100 may find it desirable to move a subscriber unit, such as subscriber unit 102, that is actively engaged in a voice call in a first network, such as packet switched network 110 or circuit switched network 120, to the other network.

In order to facilitate a handoff of a subscriber unit such as subscriber unit 102, communication system 100 provides a method and apparatus for an active handoff of subscriber unit 102 from packet switched network 110 to circuit switched network 120 or from circuit switched network 120 to packet switched network 110 when the subscriber unit is actively engaged in a voice call. By providing for an active handoff of a voice call between a packet switched CDMA network and a circuit switched CDMA network, communication system 100 assures that subscriber unit 102 is actively engaged in a communication session with at least one of networks 110 and 120 at all times, thereby minimizing the likelihood that voice traffic may be lost during the handoff.

Figure 5:
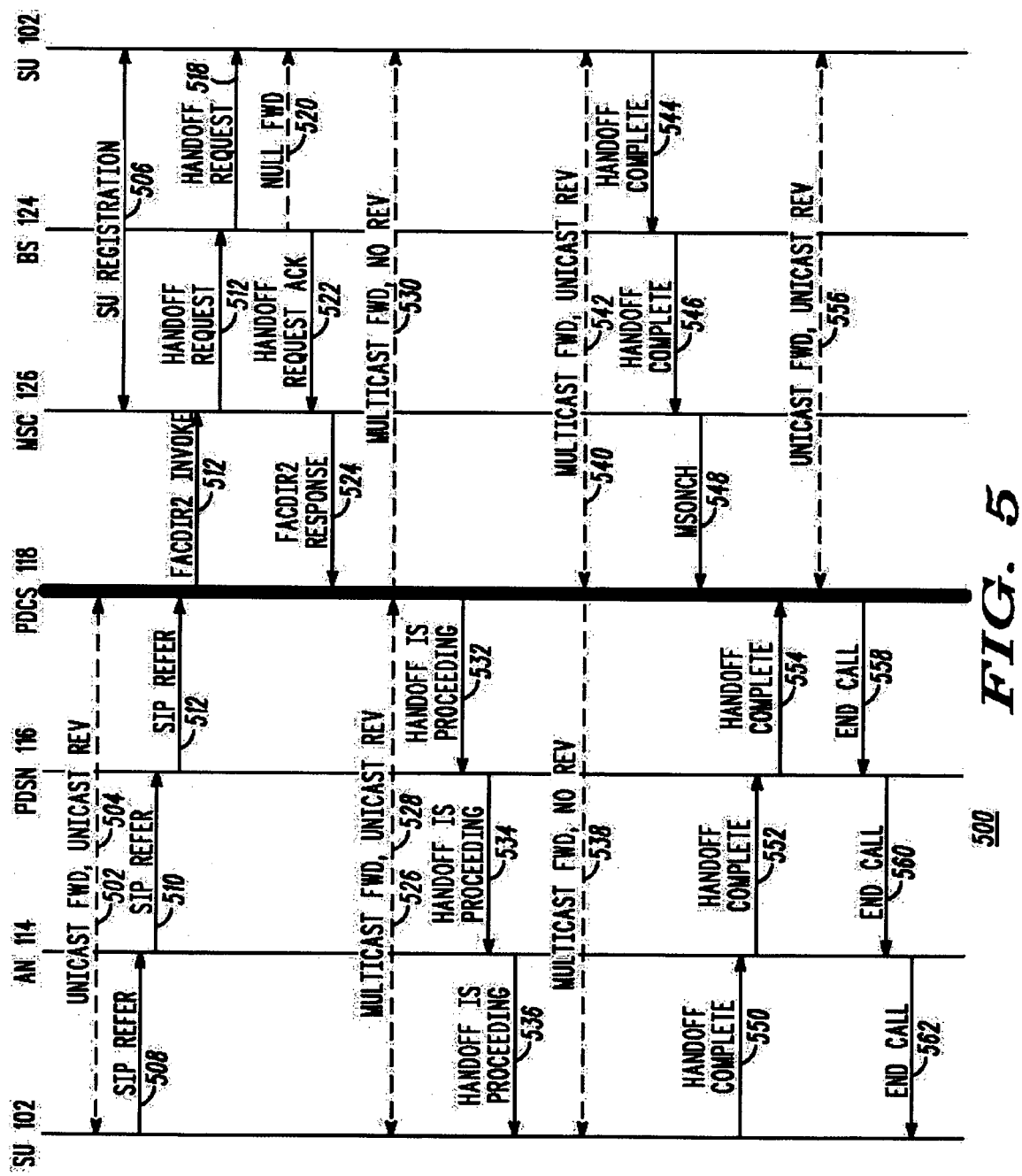
FIG. 5 is a signal flow diagram illustrating a handoff of a voice call from a packet-based network of FIG. 1 to a circuit switched network of FIG. 1 in accordance with an embodiment of the present invention.

FIG. 5 is a signal flow diagram 500 of a handoff executed by communication system 100 in handing off a voice call from packet switched network 110 to circuit switched network 120 in accordance with an embodiment of the present invention. Signal flow diagram 500 begins when subscriber unit 102 is actively engaged in a VoIP call with distant party 134 via packet switched network 110 and landline network 132. In order to participate in a VoIP call via packet switched network 110, subscriber unit 102 must already be registered with the packet switched network. As part of the call, a SIP session and a Real Time Protocol (RTP) session are active between subscriber unit 102 and PDCS 118. When PDCS 118 comprises an MSCe and an MGW, the SIP session is active between subscriber unit 102 and the MSCe and the RTP session is active between the subscriber unit and the MGW. SIP is described in Internet Engineering Task Force (IETF) Request for Comment (RFC) 3261, which RFC is hereby incorporated herein in its entirety. Subscriber unit 102 conveys 502 reverse link frames comprising voice information to PDCS 118 via a reverse link traffic channel of air interface 112, AN 114, and PDSN 116, (referred to herein as a reverse link unicast) for routing to landline network 132 and distant party 134. Further, when PDCS 118 receives voice traffic from landline network 132, and more particularly from distant party 134, and intended for subscriber unit 102, the PDCS routes 504 the voice information to AN 114 via PDSN 116 and the AN conveys forward link frames comprising the voice information to subscriber unit 102 via a forward link traffic channel of air interface 112 (referred to herein as a forward link unicast).

Prior to or during the course of the VoIP call, subscriber unit 102 further registers 506 with circuit switched network 120, and more particularly with MSC 126 via BS 124. For example, subscriber unit 102 may roam from the coverage area serviced by AN 114 to the coverage area serviced by BS 124, that is, by circuit switched network 120, and upon roaming into the coverage area of the circuit switched network registers with the circuit switched network. By way of another example, subscriber unit 102 may initially activate in an area of coverage of both AN 114 and BS 124. At activation, subscriber unit 102 may register with both packet switched network 110 and circuit switched network 120, and more particularly with PDCS 118 via AN 114 and PDSN 116 and with MSC 126 via BS 124. Such registration procedures are well-known in the art and will not be described in detail herein except to note that when a subscriber unit registers with a network, the network stores in a respective HLR or VLR an identification of an AN or BS associated with the network and serving the subscriber unit. Registration of subscriber unit 102 with each of networks 110 and 120 facilitates the network's ability to locate the subscriber unit and to determine an AN or BS to use when paging the subscriber unit. In response to registering with each of networks 110 and 120, subscriber unit 102 tunes to the forward link paging channel or paging function of the network 120.

At some point in time during the course of the VoIP call, subscriber unit 102 determines that the call should be handed off from AN 114 and packet switched network 110 to BS 124 and circuit switched network 120. As noted above, this determination may be made based on, among other considerations, any one or more of signal strength measurements, network cost/load considerations, or a directive of a user of the subscriber unit. In response to determining that the call should be handed off, subscriber unit 102 notifies 508 AN 114 of the subscriber unit's desire to initiate a handoff. AN 114 forwards 510 the notification to PDSN 116 and, in turn, the PDSN forwards 512 the notification to PDCS 118. Typically, SIP messages are transparent to network elements such as AN 114 and PDSN 116. Preferably, the notification of PDCS 118 by subscriber unit 102 of the desire for a handoff is accomplished by use of SIP messaging, and more particularly by use of a modified version of a SIP REFER message (RFC 3515) that is transmitted by the subscriber unit and forwarded to the PDCS, which SIP REFER message is modified to identify a target network, that is, circuit switched network 120, for a handoff of the identified subscriber unit.

FIG. 6 is a diagram of an exemplary modified SIP REFER message 600 that may be transmitted by subscriber unit 102 in order to initiate a handoff in accordance with an embodiment of the present invention. As depicted by FIG. 6, SIP REFER message 600 includes a first data field 602, that is, a message-type data field, that indicates that this is a SIP REFER message. SIP REFER message 600 further includes a second data field 604, that is, a destination data field, that identifies subscriber unit 102 as the destination of the message, and a third data field 606, an origination data field, that further identifies subscriber unit 102 as the originator of the message. By identifying the same subscriber unit, that is, subscriber unit 102, as the originator and target of the message, the SIP REFER message indicates that a handoff is being requested. In addition, unlike SIP REFER messages of the prior art, SIP REFER message 600 has been modified to further include a fourth data field 608, a target network indicator data field, that identifies a target network for a handoff of the identified subscriber unit. For example, as depicted in FIG. 6, target network indicator data field is named "P-Access-Network-Info" and the target network for handoff is a 3GPP2 1XRTT network such as packet switched network 110.

In response to being notified by subscriber unit 102 of the desire for a handoff and based on the target network identified by the notification, that is, circuit switched network 120, PDCS 118 determines the target MSC, that is, MSC 126, by reference to at least one of the HLR and VLR and a pre-provisioned database (not shown) included in or coupled to the PDCS 118. In response to determining the target MSC, that is, MSC 126, PDCS 118 notifies 514 MSC 126 via intermediate network 130 of the need for a handoff and further identifies the subscriber unit, that is, subscriber unit 102, requesting the handoff. Preferably, PDCS 118 notifies MSC 126 of the need for a handoff and the requesting subscriber unit by conveying a TIA-41 FACDIR2 (Facilities Directive No. 2) INVOKE message to the MSC. In response to receiving the handoff notification from PDCS 118, MSC 126 determines the target BS, that is, BS 124, by reference to at least one of the HLR and VLR included in or coupled to the MSC. MSC 126 then notifies 516 target BS 124 of the need for a handoff of subscriber unit 102, preferably by conveying a HANDOFF REQUEST message as described in detail in the IOS, to the BS.

In response to receiving the handoff notification from MSC 126, BS 124 pages 518 subscriber unit 102. BS 124 may further convey 518a handoff request message to the subscriber unit via the at least one forward link control channel of the air interface and may negotiate a vocoder format with the subscriber unit. In addition, BS 124 preferably sets up a communication session with subscriber unit 102 by allocating a forward link traffic channel and a reverse link traffic channel to the subscriber unit and further establishes a bearer path between the subscriber unit and MSC 126 in accordance with well-known techniques. For example, BS 124 may direct subscriber unit 102 to a traffic channel immediately following the page by performing an early traffic channel assignment or the BS may convey a channel assignment message (CAM) to force the subscriber unit to a traffic channel. BS 124 then initiates the establishment of a bearer path with the subscriber unit by conveying 520 null frames to the subscriber unit via the allocated forward link traffic channel. BS 124 further informs subscriber unit 102 of the allocated reverse link traffic channel via one of the allocated forward link traffic channel and the at least one forward link signaling channel.

Further, in response to receiving the handoff notification from MSC 126, BS 124 acknowledges 522 the notification received from MSC 126 of the need for a handoff by conveying an acknowledgement, preferably a HANDOFF REQUEST ACK as described in detail in the IOS, back to the MSC. In response to receiving the acknowledgement from BS 124, MSC 126 acknowledges 524 the handoff notification 514 received by the MSC from PDCS 118 by conveying a handoff notification acknowledgement to the PDCS. Preferably, the handoff notification acknowledgement comprises a TIA-41 FACDIR2 RESPONSE message to PDCS 118.

At this point in signal flow diagram 500, forward link traffic channels are established with subscriber unit 102 in each of air interfaces 112 and 122. In response to receiving the handoff notification acknowledgement from MSC 126, PDCS 118 begins to multicast 526, 530 voice traffic to subscriber unit 102. That is, when PDCS 118 receives voice traffic from distant party 134, the PDCS conveys 526 the voice traffic to subscriber unit 102 via each of packet switched network 110 and circuit switched network 120. More particularly, when PDCS 118 receives voice traffic from distant party 134, the PDCS routes a first copy of the voice traffic to AN 114 via PDSN 116 and the AN transmits a first set of forward link frames comprising the voice traffic to subscriber unit 102 via the forward link traffic channel established in air interface 112. In addition, PDCS 118 routes a second copy of the voice traffic to BS 124 via intermediate network 130 and MSC 126 and the BS transmits a second set of forward link frames comprising the voice traffic to subscriber unit 102 via the forward link traffic channel established in air interface 122. As noted above, reception of frames by subscriber unit 102 from both of networks 110 and 120 may be implemented by dual receivers, such as receivers associated with each of transceivers 302 and 304 of a subscriber unit, or may be implemented by a single receiver, such as a receiver associated with transceiver 402 of a subscriber unit, that is directed by a processor, such as processor 404 of the subscriber unit, to rapidly alternate between the networks. To facilitate the latter, PDCS 118 may force a vocoder in, or associated with, distant party 134 to a lower frame rate, such as ⅛ rate vocoder frames instead of full-rate vocoder frames. By receiving reduced rate frames, subscriber unit 102 has more time to alternate between networks 110 and 102 without complete loss of vocoder frames or the need for dual receivers. Subscriber unit 102 may implement methods well known in the art to eliminate duplicate processing of voice frames.

PDCS 118 acts as the anchor for the call, that is, as the gateway for landline network 132 into each of networks 110 and 120, and remains in the path of the call for the duration of the call, even after the call is handed off from packet switched network 110 to circuit switched network 120. By providing for multicasting before the forward link is switched from packet switched network 110 to circuit switched network 120, any potential gap in the voice traffic received by subscriber unit 102 that may result from a "break and make" hard handoff is minimized. However, in order to assure proper synchronization of the forward link frames, subscriber unit 102 may add a delay to the frames received from one of packet switched network 110 and circuit switched network 120.

At this point in signal flow diagram 500, subscriber unit 102 continues to unicast 528 reverse link frames comprising voice traffic to landline network 132, and more particularly to PDCS 118, via packet switched network 110. That is, subscriber unit 102 conveys reverse link frames comprising voice traffic only to AN 114 via the reverse link traffic channel of air interface 112, and via the AN to PDCS 118.

In addition, in response to receiving the handoff notification acknowledgement from MSC 126, PDCS 118 informs 532 subscriber unit 102 that the handoff is proceeding via the at least one forward link channel of air interface 112. In packet switched network 110, this messaging may be handled via SIP messages. Preferably, the handoff notification acknowledgement from PDCS 118 comprises a SIP REFER "202 Accepted" message to subscriber unit 102 as described in IETF RFC 3515, Section 4.1, which RFC is hereby incorporated herein in its entirety. Again, AN 114 and PDSN 116 typically are transparent to SIP messages and there are no PDCS-to-PDSN or PDSN-to-AN messages as one would find in circuit switched network 120.

In response to being informed that the handoff is proceeding, subscriber unit 102 switches from unicasting 528 reverse link frames of voice information to PDCS 118 via packet switched network 110 to unicasting 542 reverse link frames of voice information to PDCS 118 via circuit switched network 120. That is, while continuing to receive 538, 540 forward link frames comprising voice information via each of AN 114 and BS 124 and the respective forward link traffic channels of air interfaces 112 and 122, subscriber unit 102 switches from transmitting reverse link frames of voice information via packet switched network 110 and the reverse link traffic channel of air interface 112 to transmitting reverse link frames of voice information to circuit switched network 120 via the reverse link traffic channel of air interface 122. The switch of reverse link paths preferably occurs at a frame boundary, thereby providing for switching without any loss of a voice frame.

In response to switching from the reverse link traffic channel of air interface 112 to the reverse link traffic channel of air interface 122, subscriber unit 102 notifies 544 BS 124 that the subscriber unit has completed the handoff. Preferably, subscriber unit 102 notifies BS 124 that the handoff is complete by conveying a first HANDOFF COMPLETE message as described in the IOS. In response to being informed that subscriber unit 102 has completed the handoff, BS 124 informs 546 MSC 126 that the subscriber unit has completed the handoff, preferably by conveying a second HANDOFF COMPLETE message as described in the IOS, to the MSC. In turn, MSC 126 conveys 548 a message to PDCS 118 informing that subscriber unit 102 has switched to the reverse link of air interface 122, preferably by conveying a TIA-41 MSONCH message to the PDCS via intermediate network 130. Based on the message received from MSC 126, PDCS 118 determines that the subscriber unit has completed the handoff.

In addition, in response to switching from the reverse link traffic channel of air interface 112 to the reverse link traffic channel of air interface 122, subscriber unit 102 notifies 550 PDCS 118 that the handoff is complete. Preferably, the handoff complete message from subscriber unit 102 to PDCS 118 comprises a SIP REFER "200 OK" message as described in IETF RFC 3515, Section 4.1. Subscriber unit 102 may then go dormant or disconnect altogether with respect to packet switched network 110. PDCS 118 then terminates the RTP session between subscriber unit 102 and packet switched network 110 and ceases conveying forward link frames to the subscriber unit via the packet switched network, thereby converting 556 the call to a unicast forward link call via PDCS 118, circuit switched network 120, and the allocated forward link traffic channel of air interface 122. As noted above, the call has already been converted to a unicast reverse link call via circuit switched network 120 and the allocated reverse link traffic channel of air interface 122. However, the call continues as a circuit switched call via air interface 122, circuit switched network 120, intermediate network 130, and PDCS 118. Signal flow diagram 500 then ends.

FIG. 7 is a signal flow diagram 700 of a handoff executed by communication system 100 in handing off a legacy voice call communicated via circuit switched network 120 to a VoIP voice call communicated via packet switched network 110 in accordance with an embodiment of the present invention. Signal flow diagram 700 begins when subscriber unit 102 is actively engaged in a legacy, or conventional, cellular call with distant party 134 via circuit switched network 120 and landline network 132. In order to participate in the call, subscriber unit 102 must already be registered with the circuit switched network. As part of the call, distant party 134 communicates 702 with BS 124 via landline network 132 and MSC 126 using a G.711 protocol (64 kbps Pulse Code Modulation (PCM)). BS 124 transcodes the received communications to a vocoder format compatible with subscriber unit 102 and transmits 702 the transcoded information to subscriber unit 102 via a forward link traffic channel of air interface 122. Further, BS 124 receives 704 vocoded information from subscriber unit 102 via a reverse link traffic channel of air interface 122, transcodes the vocoded information to 64 kbps PCM (G.711), and conveys 704 the transcoded information to distant party 134 via MSC 126 and landline network 132.

Prior to or during the course of the call, subscriber unit 102 further registers 706 with packet switched network 110, and more particularly with AN 114 and PDCS 118, and establishes a PPP (Point-to-Point Protocol) communication session with PDSN 116 in accordance with well known techniques. A connection between the AN 114, PDSN 116, and PDCS 118 is established on packet switched network 110 such that subscriber unit 102 and PDCS 118 are able to communicate with each other. For example, subscriber unit 102 may roam from the coverage area serviced by BS 124 to the coverage area serviced by AN 114, that is, by packet switched network 110 and register with the packet switched network. By way of another example, subscriber unit 102 may initially activate in an area of coverage of both AN 114 and BS 124 and upon activation register with both packet switched network 110 and circuit switched network 120, and more particularly with PDCS 118 and MSC 126.

At some point in time during the course of the call, BS 124 determines that a handoff is required. As noted above, this determination may be made based on, among other considerations, any one or more of signal strength measurements, network cost considerations, or a network operator directive. In another embodiment of the invention, subscriber unit 102 may notify BS 124 that subscriber unit 102 needs to handoff to packet switched network 110, for example, via a modified IS-2000 signaling message. This may be initiated via user action or subscriber unit 102 may determine the need to handoff, for example, when the user initiates an email downloading session via the subscriber unit. In response to determining that the call should be handed off, BS 124 notifies 708 MSC 126 of the need to initiate a handoff. Preferably, this notification includes an indication of the target network, such as a WLAN network or a CDMA 2000 1XEV-DO network. In response to being notified by BS 124 of the need for a handoff, MSC 126 determines a target switching center, that is, target PDCS 118, by reference to at least one of the HLR and VLR and the pre-provisioned database included in or coupled to MSC 126.

In response to determining target a target switching center, MSC 126 notifies 710 the target switching center, that is, PDCS 118, via intermediate network 130 of the need for a handoff and further identifies the subscriber unit, that is, subscriber unit 102, to be handed off. Preferably, MSC 126 notifies PDCS 118 of the need to handoff the associated subscriber unit by conveying a TIA-41 FACDIR2 INVOKE message to the PDCS. In response to receiving the handoff notification from MSC 126, PDCS 118 requests subscriber unit 102 to perform a handoff of the call from the conventional cellular communication system to a VoIP communication session with the PDCS. As subscriber unit 102 is already registered on packet switched network 110, the packet switched network can determine the appropriate routing and there is no need at this time to determine a target AN.

PDCS 118 then requests 714 that subscriber unit 102 perform a handoff, preferably by conveying a SIP INVITE request or a SIP REFER message to the subscriber unit. In response to receiving the SIP INVITE request, subscriber unit 102 negotiates forward link and reverse link traffic channels with AN 114 in air interface 112 and AN 114 establishes a corresponding bearer path between the subscriber unit and PDSN 116 in accordance with well-known techniques. Subscriber unit 102 further conveys 716 a message, preferably a SIP 180 RINGING message, to PDCS 118 indicating that the subscriber unit is proceeding to activate the connection with PDCS 118.

When subscriber unit 102 has negotiated a traffic channel with AN 114 and a bearer path has been established with PDSN 116, subscriber unit 102 begins multicasting 718, 722 reverse link voice information to MSC 126 via each of the packet switched network 110 and circuit switched network 120. That is, subscriber unit 102 continues to convey 722 a first set of reverse link frames comprising vocoded information to BS 124 via the reverse link traffic channel of air interface 122, which voice information is then routed to MSC 126, and further conveys a second set of reverse link frames comprising the vocoded information to AN 114 via the reverse link traffic channel established in air interface 112, which voice information is also routed to MSC 126. In one embodiment of the present invention, in order to assure synchronization of the multicast reverse link frames, subscriber unit 102 may add delay to frames transmitted to one of packet switched network 110 and circuit switched network 120. For example, a delay may be determined based on prior handoffs of the subscriber unit between the networks, wherein PDCS 118 may calculate a delay value and convey the delay value to the subscriber unit. However, in another embodiment of the present invention, the delay may be added in the networks, for example, by MSC 126. In various embodiments of the present invention, subscriber unit 102 may concurrently transmit (718, 722) via the reverse links of air interfaces 122 and 112 by using a transmitter associated with each link, such as transmitters associated with each of transceivers 302 and 304 of a subscriber unit, or may emulate concurrent transmission (718, 722) via the reverse links of air interfaces 122 and 112 by rapidly alternating transmission via a single transmitter, such as a transmitter associated with transceiver 402 of a subscriber unit, over a reverse link of a first air interface, that is, the reverse link of air interface 122, and over a reverse link of a second air interface that is, the reverse link of air interface 112. The process of alternating transmission paths may be further enhanced by a processor of the subscriber unit, such as processor 404, forcing a vocoder of the subscriber unit, such as vocoder 408, to vocode speech at a reduced rate when transmitting over the two air interfaces. For example, by using only ⅛ rate vocoder frames instead of full-rate vocoder frames, time becomes available to rapidly switch between paths without needing to use multiple transmitters.

MSC 126 acts as the anchor for the call, that is, as the gateway for landline network 132 into each of networks 110 and 120, and remains in the path of the call for the duration of the call, even after the call is handed off from circuit switched network 120 to packet switched network 110. By providing for multicasting before the reverse link is switched from circuit switched network 120 to packet switched network 110, any potential gap in the voice traffic received by networks 110 and 120 that may result from a "break and make" hard handoff is minimized. When MSC 126 receives voice frames via each of packet switched network 110 and circuit switched network 120, MSC 126 may perform buffering and may eliminate duplicate voice frames by selecting one voice frame from each of the packet switched network and the circuit switched network.

At this point in signal flow diagram 700, forward link frames of vocoded information continue to be unicast to subscriber unit 102, that is, MSC 126 conveys 724 forward link frames comprising vocoded information to the subscriber unit only via BS 124 and the forward link traffic channel of air interface 122. However, PDCS 118 may begin conveying 720 null frames to subscriber unit 102 via the established forward link traffic channel in air interface 112.

Further, in response to establishing a communication path with subscriber unit 102 via AN 114 and air interface 112, PDCS 118 informs 726 MSC 126 that a handoff of subscriber unit 102 is progressing by conveying a handoff notification to the MSC. Preferably, the handoff notification comprises a TIA-41 FACDIR2 RESPONSE message. PDCS 118 further acknowledges 728 the message received from subscriber unit 102 indicating that the subscriber unit is proceeding to activate the connection with PDCS 118, that is, the SIP 180 RINGING message. Preferably, PDCS 118 acknowledges the message by conveying a SIP PRACK (Provisional Acknowledgement) message to the subscriber unit. In response to receiving the acknowledgement from PDCS 118, subscriber unit 102 acknowledges 730 the acknowledgement, preferably by conveying a SIP OK (RINGING) message to the PDCS.

In response to receiving the handoff notification from PDCS 118, MSC 126 switches the forward link unicast of voice information to subscriber unit 102 from circuit switched network 120 to packet switched network 110. That is, MSC 126 begins conveying 732 voice information received from distant party 134 and intended for subscriber unit 102 to AN 114 via intermediate network 130, PDCS 118, and PDSN 116, and the AN transmits forward link frames comprising vocoded information to the subscriber unit via the forward link traffic channel established in air interface 112. Meanwhile, MSC 126 ceases conveying 736 the voice information to the subscriber unit via BS 124 and the forward link traffic channel of air interface 122. However, subscriber unit 102 continues to multicast 734, 738 reverse link frames of vocoded information via each of circuit switched network 120 and packet switched network 110. That is, subscriber unit 102 continues to convey a first set of frames comprising the vocoded information to MSC 126 via BS 124 and the reverse link traffic channel of air interface 122 and a second set of frames comprising the vocoded information to MSC 126 via PDCS 118, PDSN 116, AN 114 and the reverse link traffic channel of air interface 112. As noted above, subscriber unit 102 may concurrently transmit via the reverse links of air interfaces 112 and 122 by using a transmitter associated with each link, such as a transmitter associated with each of transceivers 302 and 304, or may emulate concurrent transmission via the reverse links of air interfaces 112 and 122 by rapidly alternating between transmission via a single transceiver, such as transceiver 402, over the reverse link of air interface 112 and over the reverse link of air interface 122, which process of alternating transmission paths may be further enhanced by forcing a vocoder, such as vocoder 408, of the subscriber unit to vocode speech to a reduced rate.

MSC 126 further instructs 740 BS 124 to complete the handoff, that is, to instruct subscriber unit 102 to cease sending reverse link frames to BS 124. In response to receiving the instruction, BS 124 then instructs 742 subscriber unit 102 to cease sending reverse link frames to the BS. In response to receiving the instruction from BS 124, subscriber unit ceases sending reverse link frames to the BS, leaving the subscriber unit in a bi-directional unicast mode with MSC 126 and packet switched network 110. In other words, voice information is conveyed 744 to subscriber unit 102 only via MSC 126, PDCS 118, PDSN 116, AN 114 and the forward link traffic channel of air interface 112, and subscriber unit 102 conveys 746 voice information to MSC 126 only via PDCS 118, PDSN 116, AN 114, and the reverse link traffic channel of air interface 112.

Further, in response to switching from the reverse link of air interface 122 to the reverse link of air interface 112, subscriber unit 102 notifies 748 BS 124 that the handoff is completed, that is, that the subscriber unit is now engaged in a bi-directional unicast with packet switched network 110, that is, AN 114 and PDCS 118. Preferably, subscriber unit 102 notifies BS 124 that the handoff is completed by conveying a MS ACK ORDER message to the BS.

In response to being informed that the handoff is completed, BS 124 informs 750 MSC 126 that the handoff has commenced. In addition, in response to receiving the instruction to cease sending reverse link frames to BS 124, subscriber unit 102 informs 752 PDCS 118 that the request to perform a handoff received by the subscriber unit from the PDCS, that is, the SIP INVITE request, has been successfully executed, preferably by conveying a SIP 200 OK message to the PDCS.

In response to being informed that the request to perform a handoff has been successfully executed, PDCS 118 acknowledges 754 the successful execution message, preferably by conveying a SIP ACK to subscriber unit 102. PDCS 118 further informs 756 MSC 126 that the subscriber unit is successfully exchanging voice frames on a bi-directional basis with packet switched network 110, that is, with AN 114 and PDCS 118, preferably by conveying a TIA-41 MSONCH message to the MSC via intermediate network 130. Based on the message received from PDCS 118, MSC 126 determines that subscriber unit 102 has completed the handoff and so informs 758 BS 124, preferably by conveying a CLEAR COMMAND message to the BS. In response to being informed that subscriber unit 102 has completed the handoff, BS 124 terminates the legacy call, that is, the circuit switched network call, with the subscriber unit. Upon terminating the legacy call, BS 124 informs 760 MSC 126 that the legacy call has been terminated, preferably by conveying a CLEAR COMPLETE message to the MSC. Signal flow diagram 700 then ends.

In summarization, communication system 100 provides for an active handoff of a voice call between packet switched network 110, preferably a CDMA 2000 1XRTT network, a CDMA 2000 1XEV-DO network, or a WLAN network, and circuit switched network 120, preferably a CDMA 1X network, by multicasting the call over both networks during the course of the handoffs. An active handoff from packet switched network 110 to circuit switched network is accomplished by multicasting the call over forward links of both networks during the handoff. An active handoff from the circuit switched network to the packet switched network is accomplished by multicasting the call over reverse links of both networks during the handoff. The former handoff further may be facilitated by maintaining PDCS 118 in the call even when the call is routed through circuit switched network 120, and the latter handoff further may be facilitated by maintaining MSC 126 in the call even when the call is routed through packet switched network 110. In order for hybrid subscriber unit 102 to operate concurrently in both network 110 and network 120, the subscriber unit may comprise multiple transceivers. However, in another embodiment of the present invention, subscriber unit 102 may comprise a single transceiver that is rapidly switched between networks 110 and 120 to give the appearance of concurrent operation. In addition, when switching between networks, a vocoder 408 in the single transceiver subscriber unit 102 may be instructed by the processor to use a reduced rate that allows for the time for the rapid switching without severely degrading voice quality.

While the present invention has been particularly shown and described with reference to particular embodiments thereof, it will be understood by those skilled in the art that various changes may be made and equivalents substituted for elements thereof without departing from the scope of the invention as set forth in the claims below. Furthermore, one of ordinary skill in the art realizes that the components and operations of the transmitting communication device and receiving communication device detailed herein are not intended to be exhaustive but are merely provided to enhance an understanding and appreciation for the inventive principles and advantages of the present invention, rather than to limit in any manner the invention. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for inter-network handoff of a voice call from a circuit switched network to a packet switched network, the method comprising:
    conveying forward link voice traffic to, and receiving reverse link voice traffic from, a subscriber unit via the circuit switched network in association with the call;
    determining to hand off the call;
    receiving, by the packet switched network notification of the need for a handoff;
    in response to receiving the handoff notification, conveying, by the packet switched network to the subscriber unit, a request to perform the handoff and establishing a communication session between the packet switched network and the subscriber unit;
    receiving reverse link voice traffic from the subscriber unit via the circuit switched network and via the packet switched network;
    when receiving reverse link voice traffic via the packet switched network and the circuit switched network, switching from the circuit switched network to the packet switched network for conveyance of the forward link voice traffic to the subscriber unit; and
    in response to switching the forward link voice traffic from the circuit switched network to the packet switched network, ceasing reception of reverse link voice traffic via the circuit switched network while continuing to receive reverse link voice traffic via the packet switched network.

2. The method of claim 1, wherein the circuit switched network notifies the packet switched network of the need for a handoff.

3. The method of claim 1, wherein establishing a communication session between the packet switched network and the subscriber unit comprises:
    establishing a Point-to-Point Protocol communication session with the subscriber unit; and
    establishing a bearer path between the packet switched network and the subscriber unit.

4. The method of claim 3, wherein receiving the reverse link voice traffic from the subscriber unit via the circuit switched network and via the packet switched network comprises receiving reverse link frames comprising voice traffic from the subscriber unit via the established bearer path between the packet switched network and the subscriber unit.

5. The method of claim 1, further comprising:
    establishing a bearer path between the packet switched network and the subscriber unit;
    in response to establishing the bearer path between the packet switched network and the subscriber unit, conveying a handoff notification by the packet switched network to the circuit switched network; and wherein the conveyance of forward link voice traffic to the subscriber unit is switched from the circuit switched network to the packet switched network in response to the conveyance of the handoff notification by the packet switched network to the circuit switched network.

6. The method of claim 5, wherein the handoff notification conveyed by the packet switched network to the circuit switched network comprises a TIA-41 FACDIR2 RESPONSE message.

7. The method of claim 5, wherein the circuit switched network comprises a mobile switching center and wherein switching from the circuit switched network to the packet switched network for the conveyance of the forward link voice traffic to the subscriber unit comprises switching from the mobile switching center and the circuit switched network to and the packet switched network for said conveyance of said forward link voice traffic.

8. The method of claim 1, wherein said ceasing reception of reverse link voice traffic via the circuit switched network comprises:

instructing the subscriber unit, by the circuit switched network, to cease conveying reverse link voice traffic to the circuit switched network; and in response to said conveying the instruction, ceasing reception of reverse link voice traffic by the circuit switched network.

9. The method of claim 8, further comprising:

receiving, by the packet switched network from the subscriber unit, information that the request to perform the handoff has been successfully executed;

in response to being informed that that the request to perform the handoff has been successfully executed, informing the circuit switched network, by the packet switched network, that the packet switched network is engaged in a bi-directional exchange of voice traffic with the subscriber unit; and in response to being informed that the packet switched network is engaged in the bi-directional exchange of voice traffic with the subscriber unit, terminating the circuit switched network call.

10. The method of claim 1, further comprising receiving, by the circuit switched network, notification that the handoff is completed.

11. The method of claim 1, further comprising while receiving the reverse link voice traffic from the subscriber unit via the circuit switched network and via the packet switched network and prior to switching from the circuit switched network to the packet switched network for conveyance of the forward link voice traffic to the subscriber unit, conveying forward link voice traffic to the subscriber unit only via the circuit switched network.

12. A communication system that provides for inter-network handoff of a voice call from a circuit switched network to a packet switched network, the system comprising:

a base station that transmits forward link voice traffic to a subscriber unit via a first forward link, receives reverse link voice traffic from the subscriber unit via a first reverse link in association with the call;

a mobile switching center, in communication with the base station, that conveys the forward link voice traffic to the base station and receives the reverse link voice traffic from the base station;

a packet data control switch that receives a notification of a handoff of the call and, in response to receiving the handoff notification, requests that the subscriber unit perform the handoff;

an access network in communication with the packet data control switch that, in response to the request to perform the handoff, establishes a second forward link and a second reverse link with the subscriber unit; and wherein, in response to the establishment of the second forward link and the second reverse link with the subscriber unit, each of the base station and the access network receives reverse link voice traffic from the subscriber unit and conveyance of the forward link voice traffic to the subscriber unit is switched from the base station and the first forward link to the access network and the second forward link, and wherein, in response to switching said conveyance of the forward link voice traffic from the base station and the first forward link to the access network and the second forward link, the base station ceases receiving the reverse link voice traffic while the access network continues to receive the reverse link voice traffic.

13. The system of claim 12, wherein the mobile switching center notifies the packet data control switch of the need for the handoff.

14. The system of claim 12, wherein the packet data control switch, in response to the establishment of the second forward link and the second reverse link with the subscriber unit, conveys the handoff notification to the mobile switching center and wherein the mobile switching center, in response to receiving the handoff notification from the packet data control switch, switches the forward link voice traffic from the base station and the first forward link to the access network and the second forward link.

15. The system of claim 14, wherein the handoff notification conveyed by the packet data control switch to the mobile switching center comprises a TIA-41 FACDIR2 RESPONSE message.

16. The system of claim 12, wherein prior to switching from the base station and the first forward link to the access network and the second forward link for the conveyance of the forward link voice traffic to the subscriber unit, and while each of the base station and the access network receives the reverse link voice traffic from the subscriber unit, only the base station conveys forward link voice traffic to the subscriber unit.

\* \* \* \* \*